Figure 1:
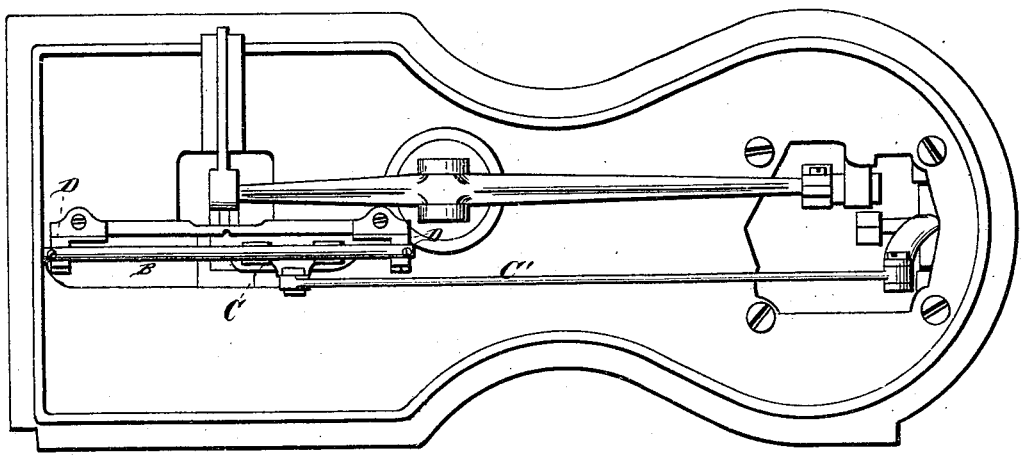

(No Model.)

J. H. GRIFFIN.
SEWING MACHINE.

No. 291,719. Patented Jan. 8, 1884.

WITNESSES
INVENTOR
ATTORNEY

UNITED STATES PATENT OFFICE.

JOHN H. GRIFFIN, OF HARTFORD, CONNECTICUT.

SEWING-MACHINE.

SPECIFICATION forming part of Letters Patent No. 291,719, dated January 8, 1884.

Application filed July 22, 1881. (No model.)

*To all whom it may concern:*

Be it known that I, JOHN H. GRIFFIN, of the city of Hartford, Hartford county, in the State of Connecticut, have invented certain new and useful Improvements in Sewing-Machines; and I do hereby declare that the following specification, taken in connection with the drawings furnished, is a full, clear, and exact description, sufficient to enable others skilled in the art to make and practice the same.

My invention consists in the combination of two guides forming a race, so arranged and operating as to be capable of a definite and rigid adjustment to provide for any wear that might occur to the engaging parts in practice.

My invention further consists in a device for attaching the shuttle-race or guide-bars to the machine in such manner that both guide-bars may be adjusted toward or away from the bed of the machine, as well as with reference to each other.

The object of my invention is to enable the operator to adjust the slides which form the shuttle-race in such a manner as to cause them to evenly approach each other, and adapted to be held securely in a desired position—that is to say, when the slides or the shuttle-carrier become worn (either one or all of them) the operator can readily make the proper adjustment without disconnection of parts, which is accomplished by means of adjusting-screws for moving said slides, and clamping devices to securely hold the said slides in a fixed desirable position, by which means the shuttle race or guides and shuttle-carrier are made to operate smoothly and without lost motion under all circumstances, even after many years of continued, constant, and hard use.

Figure 2:
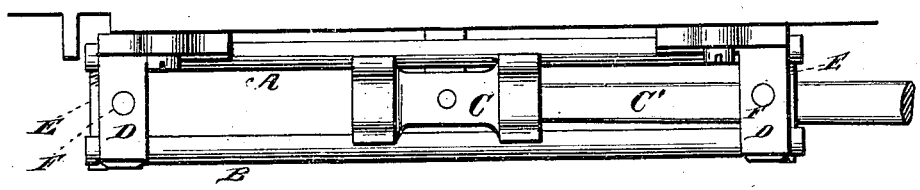
Figure 3:
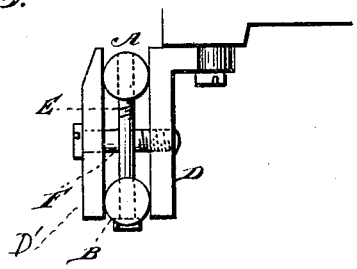

Referring to the drawings, Figure 1 represents the under side of a sewing-machine with my improvement in position. Fig. 2 represents a side view of the said improvement. Fig. 3 represents an end view of the race or guide, showing the adjusting devices referred to.

To enable others to more fully understand the construction and the operations of my said improvement, I will explain more fully in detail.

A and B represent two rods arranged and secured parallel with each other, and held firmly in position between posts D and D', while their relative positions parallel to each other is secured by means of two adjusting-screws, (represented at E E,) which pass through said rods at or near their ends, substantially as shown in the drawings. The screw is represented as being threaded at one end only, while its opposite end is provided with a slotted head for operating the same. Yet it is obvious that the screw may be threaded at both ends with a right and left screw, and the head dispensed with, the principal object being to secure the adjustment of the said rods forming the guide substantially in the manner and for the purpose before described. Means for locking or clamping the said rods by means of the two posts D D' are represented by screws F F, which pass through the one post to the other, which is threaded to receive it. The adjustment of the parts is accomplished by tightening said screws F F, after having first loosened them to admit of the parallel adjustment of the rods before referred to, by which tightening said rods are rigidly clamped in a fixed position without liability to yield, thereby securing a smooth-acting non-rattling action to the shuttle-carrier, which is very important.

The shuttle-carrier is represented at C in the drawings, which carrier holds the shuttle, and is similar to other carriers for the same purpose in other machines, with perhaps a slight difference in the parts thereof, which form saddles which engage and slide upon and between the two parallel rods or guides.

C' represents a portion of rod which imparts motion to the shuttle-carrier. The posts D D' are represented as being formed separate from the bed of the machine proper; yet I propose to cast them upon said bed for economy and convenience.

It will be apparent that my shuttle guide-bars A and B are not only adjustable with reference to each other by means of screws E, but both or either of the bars may be adjusted nearer to or farther from the bed of the machine by a movement up or down in the jaws of the clamp D D'. Thus, if one of the bars is in proper position, the other may be adjusted thereto without moving said first-mentioned bar.

My improvement is adapted for nearly all of the ordinary reciprocating shuttle sewing-machines in use.

I would remark that, in addition to the adjustment of the parts referred to, the rods can be hardened and made more durable in consequence.

I am aware that prior to my invention devices had been patented which were intended to adjust the guide-bars of a shuttle-race to compensate for wear. I therefore do not claim such feature, broadly.

Having thus described my invention, what I claim as new, and desire to secure by Letters Patent of the United States of America, is—

1. The combination, with the bed of a sewing-machine, of a fixed standard and a movable jaw and screw forming a clamp, and adjustable guide-bars forming the shuttle-race, said guide-bars being held in position by the clamp, substantially as stated.

2. The combination, with a sewing-machine bed, of the fixed standards or brackets, movable posts, and set-screws, the same forming clamping devices, the round guide-rods and adjusting-screws forming the shuttle-race, the shuttle-carrier having concave bearing-surfaces, and suitable driving mechanism, substantially as described.

JOHN H. GRIFFIN. [L. S.]

In presence of—
WM. WALDO HYDE,
LOREN P. WALDO.